(12) United States Patent
Bloemen et al.

(10) Patent No.: US 7,967,477 B2
(45) Date of Patent: Jun. 28, 2011

(54) COMPACT OPTICAL SYSTEM AND LENSES FOR PRODUCING UNIFORM COLLIMATED LIGHT

(75) Inventors: Pascal J. H. Bloemen, Endhoven (NL); Emanuel N. H. J. Stassar, Sprang Capelle (NL)

(73) Assignee: Philips Lumileds Lighting Company LLC, San Jose, CA (US)

( * ) Notice: Subject to any disclaimer, the term of this patent is extended or adjusted under 35 U.S.C. 154(b) by 0 days.

(21) Appl. No.: 11/851,244

(22) Filed: Sep. 6, 2007

(65) Prior Publication Data

US 2009/0067170 A1    Mar. 12, 2009

(51) Int. Cl.
   *F21V 7/00*    (2006.01)

(52) U.S. Cl. ........ 362/299; 362/235; 362/255; 362/800; 362/268; 362/296.01; 362/217.04; 362/217.05; 362/219; 362/222; 362/224

(58) Field of Classification Search ................. 362/235, 362/255, 800, 268, 296, 299, 296.01, 217.04, 362/217.05, 219, 217.02, 222, 224
See application file for complete search history.

(56) References Cited

U.S. PATENT DOCUMENTS

| | | | | |
|---|---|---|---|---|
| 4,577,260 A | * | 3/1986 | Tysoe | 362/521 |
| 6,097,549 A | * | 8/2000 | Jenkins et al. | 359/726 |
| 6,529,678 B2 | * | 3/2003 | Shie et al. | 385/147 |
| 6,679,621 B2 | * | 1/2004 | West et al. | 362/327 |
| 6,814,475 B2 | * | 11/2004 | Amano | 362/487 |
| 6,827,467 B2 | * | 12/2004 | Tenmyo | 362/268 |
| 6,899,451 B2 | * | 5/2005 | Kittelmann et al. | 362/538 |
| 7,254,309 B1 | * | 8/2007 | Chou et al. | 385/146 |
| 2002/0105801 A1 | * | 8/2002 | Martineau | 362/244 |
| 2004/0047160 A1 | | 3/2004 | Fong | |
| 2004/0057244 A1 | * | 3/2004 | Amano | 362/518 |
| 2005/0281047 A1 | * | 12/2005 | Coushaine et al. | 362/555 |
| 2005/0286251 A1 | | 12/2005 | Smith | |
| 2006/0102914 A1 | * | 5/2006 | Smits et al. | 257/98 |

FOREIGN PATENT DOCUMENTS

DE   202005010490 U1   7/2005
EP         869312 A2 * 10/1998

* cited by examiner

*Primary Examiner* — Ali Alavi
*Assistant Examiner* — Mary Zettl

(57) ABSTRACT

An optical system includes a cylindrical side emitter lens, a reflector and a cylindrical Fresnel lens to produce a substantially uniformly illuminated exit plane with well collimated light in the forward direction. The cylindrical side emitter lens redirects light from a light source, such as a number of light emitting diodes placed in a straight line, into side emitted light along an optical axis that is parallel with the exit plane. The reflector may be a stepped multi-focal length reflector that includes multiple reflector surfaces with different focal lengths based on the surfaces distance to the light source and height to redirect light from the cylindrical side emitter lens to illuminate the exit plane and collimate the light along one axis in the forward direction. The cylindrical Fresnel lens is used to collimate the light along an orthogonal axis in the forward direction.

12 Claims, 3 Drawing Sheets

COMPACT OPTICAL SYSTEM AND LENSES FOR PRODUCING UNIFORM COLLIMATED LIGHT

FIELD OF THE INVENTION

The present invention is related to an optical system and lenses for a compact light source that produces well collimated illumination and in particular a low height optical system with a narrow aspect ratio that is well collimated and uniform illumination across the exit plane.

BACKGROUND

Many light source applications have space and illumination limitations. While small sources of light, such as light emitting diodes, may be used for space savings purposes, these devices require additional optical systems to produce the desired illumination. For example, in some applications it may be desirable to provide a light source with well collimated light or illumination that is substantially uniform over an area. It is desired to provide an optical system and lenses that can produce well collimated light from a uniformly lit surface area but that does not require a large amount of space.

SUMMARY

In accordance with one embodiment of the present invention, an optical system includes a cylindrical side emitter lens, a reflector and a cylindrical Fresnel lens to produce a substantially uniformly illuminated exit plane with well collimated light in the forward direction. The cylindrical side emitter lens redirects light from a light source, such as a number of light emitting diodes placed in a straight line, into side emitted light along an optical axis that is parallel with the exit plane. The reflector may be a stepped reflector that includes multiple reflector surfaces with different focal lengths based on the surfaces distance to the light source and height to redirect light from the cylindrical side emitter lens to illuminate the exit plane and collimate the light along one axis in the forward direction. The cylindrical Fresnel lens is used to collimate the light along an orthogonal axis in the forward direction.

In another embodiment of the present invention, a cylindrical side emitter lens includes a bottom surface that is parallel to an optical axis and a cavity in which one or more light sources may be positioned. The inner surface of the cavity consists of two planar surfaces and one essentially spherical surface. The outer surface of the lens consists of a total internal reflection (TIR) reflecting surface, a first refracting surface that is also planar and that is obliquely angled with respect to a central axis of the lens, the central axis being orthogonal to the optical axis. A second refracting surface extends from the bottom surface to the first refracting surface. Light that enters the lens from the cavity and is directly incident on the reflecting surface is reflected to the first refracting surface and refracted to exit the lens in a direction substantially parallel with the optical axis. Moreover, light that enters the lens from the cavity and is directly incident on the second refracting surface is refracted to exit the lens in a direction that is also substantially parallel to the optical axis. The cylindrical side emitter lens has a cross sectional shape in a plane defined by the central axis and the optical axis and has the same cross sectional shape at every point along a horizontal axis that is orthogonal with the optical axis and the central axis.

In another embodiment of the present invention, a stepped multi-focal length reflector uses multiple reflector surfaces that are positioned at a different distances from a light source and are positioned at a different heights with respect to an optical axis. The reflector surface that is closest to the light source has the lowest height on the optical axis and the reflector surface that is farthest from the light source has the greatest height on the optical axis. Each reflector surface has a different focal length that is based on the distance of the reflector surface to the light source and on the height of the reflector surface on the optical axis. The focal length of each reflector surface is configured to redirect light from a light source into the forward direction and to produce substantially uniform illumination over an exit plane and substantially collimate the light along the optical axis.

DETAILED DESCRIPTION

Figure 1:
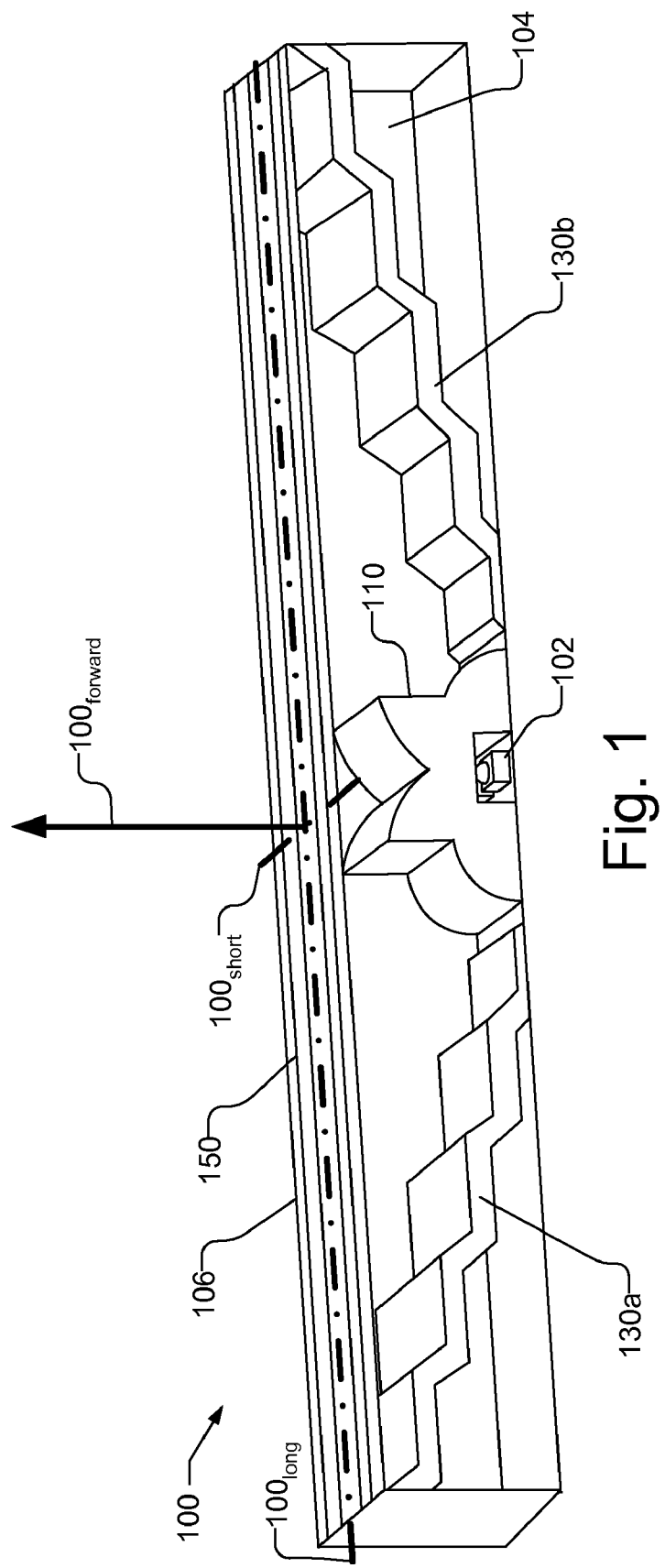
FIG. 1 illustrates a perspective view of an optical system that may be used with compact light sources, such as light emitting diodes (LEDs), in accordance with one embodiment of the present invention.
Figure 2:
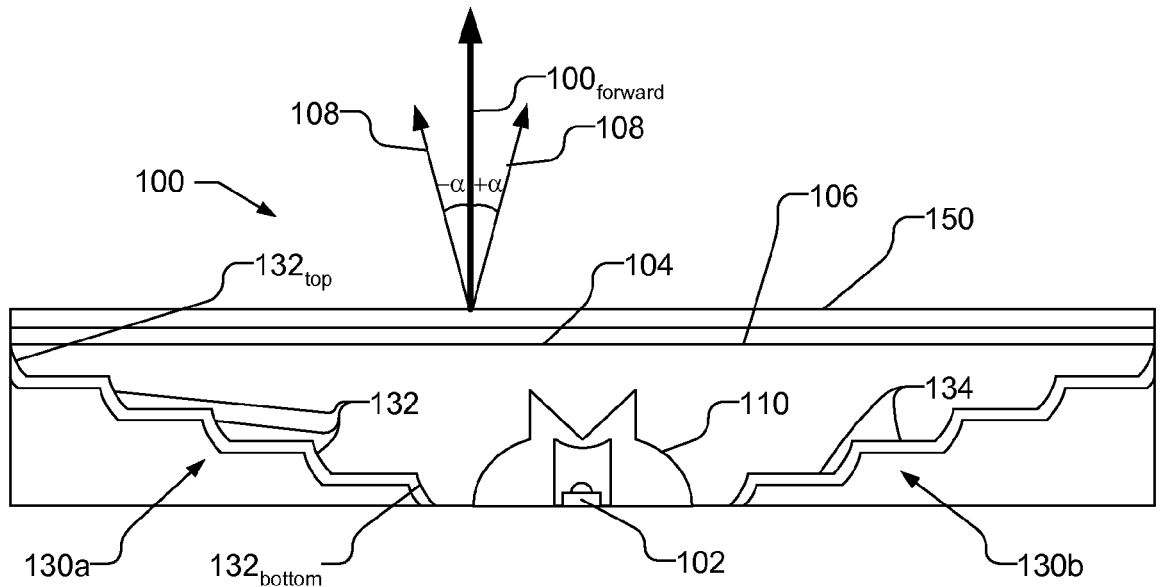
FIGS. 2 and 3 are side views of the optical system of FIG. 1, along orthogonal axes.
Figure 3:
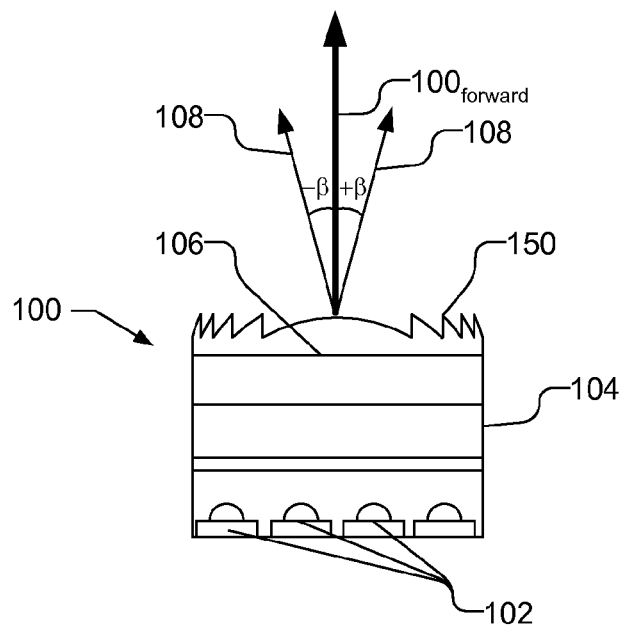

FIG. 1 illustrates a perspective view of an optical system 100 that may be used with compact light sources, such as light emitting diodes (LEDs) 102 in accordance with one embodiment of the present invention. As can be seen, the optical system 100 has a narrow aspect ratio, e.g., 3:1, but this may vary as desired. FIGS. 2 and 3 are side views of the optical system 100 along the long axis $100_{long}$ and the short axis $100_{short}$, respectively. The long axis $100_{long}$ and the short axis $100_{short}$ are orthogonal to each other. The optical system 100 causes the light emitted from the light source to be distributed substantially uniformly across an exit window 106 of the optical system 100 and to be well collimated, i.e., directed in a direction substantially perpendicular to the plane of the exit window 106. It is well understood in the art that collimated light is not perfectly collimated, but may have some degree of angular spread.

As illustrated in FIG. 3, the optical system 100 may be used with a plurality of light sources, e.g., four LEDs 102 that are placed in the same plane and in a straight line parallel to the short axis $100_{short}$ of the optical system 100. Any conventional LEDs 102 or other light source may be used with the present invention. In one embodiment, the LEDs 102 produce a substantially lambertian radiation pattern and may be phosphor converted blue LEDs that produce white light or any color of light. Preferably, the light sources used with the optical system 100 produce substantially uniform radiation along the short axis $100_{short}$. Substantially uniform illumination may be, for example, sufficiently uniform that no disturbing strong light variations can be observed by eye. It should be understood that while some variation of the illumination may present, the variation either cannot be detected by eye or is not disturbing.

Figure 4:
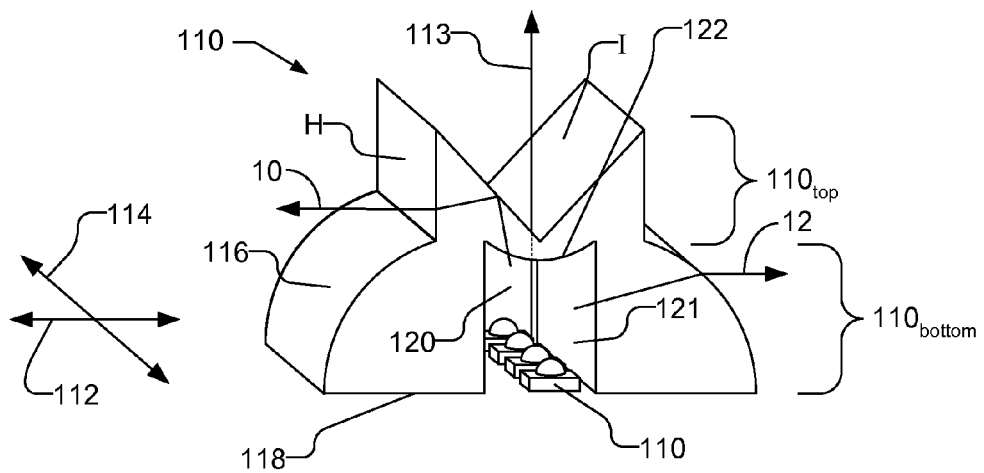
FIG. 4 illustrates a perspective view of one embodiment of a cylindrical side emitter lens.

The optical system 100 includes a cylindrical side emitter lens 110 that, in accordance with one aspect of the present invention, redirects a light from the LEDs 102 in a direction that is parallel with the long axis $100_{long}$ and the exit plane 106. FIG. 4 illustrates a perspective view of one embodiment of the cylindrical side emitter lens 110. The cylindrical side emitter lens 110 has a cross section along a plane defined by the optical axis 112 of the lens 110 and a central axis 113 that may be similar in shape to rotationally symmetrical conventional side emitter lens, such as that described in U.S. Pat. No. 6,679,621, which is incorporated herein by reference. Along this cross section, the cylindrical side emitter lens 110 includes a "V" shaped top portion $110_{top}$ having a reflecting (e.g., totally internally reflecting) surface I and a refracting surface H. The reflecting surface I and refracting surfaces form planes, with the reflecting surface being obliquely angled with respect to the central axis 113. The lower portion $110_{bottom}$ has a refracting surface 116 that extends as a smooth curve from refracting surface H to a bottom surface 118 of the lens 110.

The LEDs 102 are positioned inside a cavity 120 in the lens 110. The inner surface of the cavity 120 consists of two planar surfaces 121 and one essentially spherical surface 122. The cavity 120 may contain a gas, may be under vacuum, or may include a non-gaseous material, such as a solid, liquid or gel that may assist in light extraction. The external sides of the cavity 120, i.e., the sides orthogonal to the reflecting and refracting surfaces I, H, and 116, may be covered with a reflective film, either on the lens 110 or on the sides of the optical system 100. A small portion of the light that is incident on the reflecting surface I may be transmitted and used to illuminate the exit plane 106. Light 10 entering the lens 110 from the cavity 120 and directly incident on the reflecting surfaces I is reflected to the first refracting surface H and refracted to exit the lens 110 in a direction substantially parallel with the optical axis 112. Light 12 entering the lens 110 from the cavity 120 that is directly incident on the second refracting surface 116 is also refracted to exit the lens 110 in a direction substantially parallel to the optical axis 112.

As can be seen in FIG. 4, the cross sectional shape of the cylindrical side emitter lens 110 along the plane defined by the optical axis 112 and the central axis 113, is the same cross sectional shape at every point along a horizontal axis 114 that is orthogonal to the optical axis 112. Thus, unlike conventional side emitter lenses, the cylindrical side emitter lens 110 is not rotationally symmetrical. It should be understood that the cross-sectional shape of the side emitter lens 110 is exemplary and that other cross sectional shapes of side emitter lenses may be used if desired. The lens 110 may be produced using, e.g., vacuum casting or injection molding using a material such as polycarbonate, PMMA, or other appropriate material.

As shown in FIG. 1, reflectors 130 are present in the optical system 100 to redirect the side emitted light from the cylindrical side emitter lens 110 into the forward direction $100_{forward}$, which is perpendicular to the long axis $100_{long}$ and the short axis $100_{short}$. The optical system 100 includes two stepped multi-focal line reflectors 130a and 130b, collectively referred to as reflectors 130, that are located on opposite sides of the cylindrical side emitter lens 110. If desired, only one reflector 130 may be used, with the cylindrical side emitter lens 110 being positioned at one end of the optical system 100. The cylindrical side emitter lens 110 would not need to be symmetrical across the short axis. In another embodiment, the reflectors 130 may be a continuous reflector with an appropriate shape, e.g., spline, over the entire length to redirect the side emitted light into forward directed light.

The reflectors 130 include a plurality of reflector surfaces 132 that are positioned at difference distances from the cylindrical side emitter lens 110. Additionally, the reflector surfaces 132 are positioned at different heights as measured with respect to the forward direction $100_{forward}$. As can be seen, the highest reflector surface $132_{top}$ is also the farthest away from the cylindrical side emitter lens 110 and the lowest reflector surface $132_{bottom}$ is the closest to the side emitter lens 110. The reflector surfaces 132 may be connected to each other, e.g., via a step 134 as illustrated or alternatively may be separate and supported by the sidewalls 104 of the optical system 100. Moreover, as can be seen more clearly in the side view shown in FIG. 2, the reflector surfaces 132 are parabolic shaped. The focal length of each parabolic reflector surface 132 is selected to correspond to the distance between the reflector surface 132 and the cylindrical side emitter lens 110. The configuration of the reflector surfaces 132, i.e., their parabolic shapes and positions including height and distance from the cylindrical side emitter lens 110, redirects the side emitted light to forward directed light that, in conjunction with the portion of light that is forward emitted by the cylindrical side emitter lens 110, results in substantially uniform illumination along the length, i.e., along the long axis $100_{long}$, of the exit plane 106. Substantially uniform illumination may be, for example, sufficiently uniform that no disturbing strong light variations can be observed by eye. It should be understood that while some variation of the illumination may present, the variation either cannot be detected by eye or is not disturbing.

The reflectors 130, like the cylindrical side emitter lens 110, may be produced using, e.g., vacuum casting or injection molding using a material such as polycarbonate, PMMA, or other appropriate material.

With the combined cylindrical side emitter lens 110 and the stepped multi-focal line reflectors 130a and 130b, the light is substantially uniform along the length of the optical system and is well collimated in the forward direction $100_{forward}$. As illustrated in FIG. 2, with respect to the long axis and the forward direction $100_{forward}$, the light is substantially collimated, i.e., the light has an angular spread α of ±15 degrees around the forward direction in a plane defined by the forward direction $100_{forward}$ and the long axis $100_{long}$.

The optical system 100 further includes cylindrical Fresnel lens 150 at the exit plane 106 to collimate the light around forward direction $100_{forward}$, in a plane defined by the forward direction $100_{forward}$ and the short axis $100_{short}$, as illustrated in FIG. 3. It should be understood that FIG. 3 illustrates the optical system 100 along the short axis but does not show the reflectors 130 for the sake of simplicity. The cylindrical Fresnel lens 150 when viewed in the cross section along the short axis, illustrated in FIG. 3, has a conventional Fresnel configuration. The cylindrical Fresnel lens 150 has this same cross section at every point along the long axis. The cylindrical Fresnel lens 150 substantially collimates the light in the forward direction $100_{forward}$ with respect to the short axis, i.e., the light has an angular spread β of ±15 degrees around the forward direction.

The cylindrical Fresnel lens 150, like the cylindrical side emitter lens 110, may be produced using, e.g., vacuum casting or injection molding using a material such as polycarbonate, PMMA, or other appropriate material.

Figure 5:
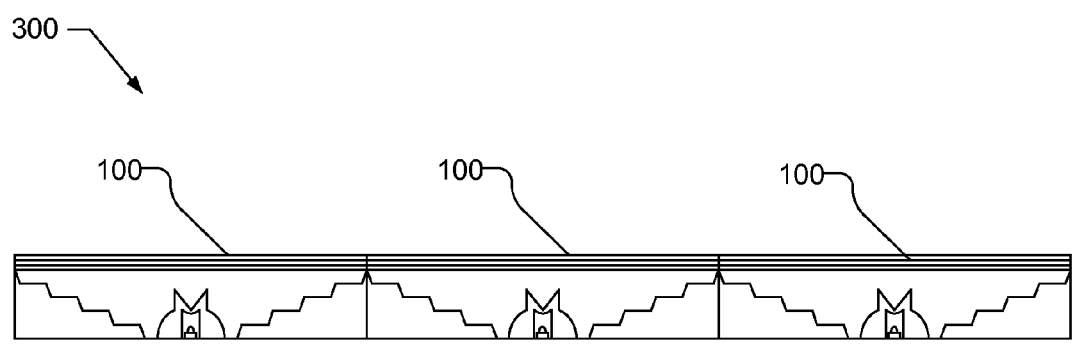
FIG. 5 illustrates in perspective view multiple optical systems of FIG. 1 coupled together.

With the use of the cylindrical side emitter lens 110, the stepped multi-focal reflectors 130a and 130b and the cylindrical Fresnel lens 150, the height of the optical system 100 is minimized while realizing a good degree of collimation. By way of example, an optical system 100 having an aspect ration of 90 mm×30 mm, the optical height is less than 10 mm. In some embodiments, an optical system 300 may include multiple optical systems 100 that are coupled together, as illustrated in FIG. 5.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. An optical system for producing substantially collimated light in a forward direction, wherein the optical system has a long axis and a short axis that are orthogonal to each other and the forward direction is perpendicular to the long axis and the short axis, the optical system comprising:
   at least one light source;
   a cylindrical side emitter lens optically coupled to the at least one light source, the cylindrical side emitter lens having a cylindrical axis parallel to the short axis and configured to redirect a portion of light emitted from the at least one light source to provide side emitted light that is perpendicular to the forward direction and parallel to the long axis;
   at least one reflector positioned to receive the side emitted light from the cylindrical side emitter lens and redirect the light substantially in the forward direction, the reflector is configured so that substantially uniform illumination is produced over an exit plane of the optical system and the light that is reflected by the reflector is substantially collimated in the forward direction with respect to a plane defined by the forward direction and the long axis; and
   a cylindrical Fresnel lens coupled to receive the forward directed light from the at least one reflector, the cylindrical Fresnel lens having a cylindrical axis parallel to the long axis that substantially collimates the forward directed light with respect to a plane defined by the forward direction and the short axis.

2. The optical system of claim 1, wherein there are two reflectors with the cylindrical side emitter lens disposed between the two reflectors.

3. The optical system of claim 1, wherein the at least one light source is a plurality of light sources arranged in a line parallel to the short axis.

4. The optical system of claim 3, wherein the light sources are light emitting diodes.

5. The optical system of claim 1, wherein the cross sectional shape of the cylindrical side emitter lens comprises a top portion and a bottom portion, the top portion having a "V" shape with each arm of the "V" shape including a reflecting surface on the inside of the "V" shape and a refracting surface on the outside of the "V" shape, the bottom portion having a refracting surface that extends as a smooth curve from the refracting surface of the "V" shape to a bottom surface, the cross sectional shape of the cylindrical side emitter lens further comprising a cavity in which the at least one light source is disposed.

6. The optical system of claim 1, wherein the cylindrical Fresnel lens has a cross sectional shape of a Fresnel lens along a plane defined by the forward direction and the short axis and wherein the cylindrical Fresnel lens has the same cross sectional shape at every point along the long axis.

7. The optical system of claim 1, wherein the at least one reflector is at least one stepped multi-focal reflector having multiple reflector surfaces positioned at different distances from the cylindrical side emitter lens and at different heights with respect to the forward direction, the multiple reflector surfaces have different focal lengths that vary based on the distance and height of each reflector surface, wherein the configuration of the focal length, the distance from the cylindrical side emitter lens, and height of each reflector surface produces the substantially uniform illumination over the exit plane of the optical system and substantially collimates the light in the forward direction.

8. The optical system of claim 7, wherein the multiple reflector surfaces are coupled together.

9. The optical system of claim 1, wherein light substantially collimated by the reflector has an angular spread of ±15 degrees or less and wherein the cylindrical Fresnel lens substantially collimating light produces light with an angular spread of ±15 degrees or less.

10. The optical system of claim 1, further comprising multiple light sources, cylindrical side emitter lenses, reflectors, and cylindrical Fresnel lenses coupled together.

11. The optical system of claim 1 wherein the cylindrical side emitter lens comprises:
   a cavity in which one or more light sources may be positioned;
   a light entry surface that is configured to receive light from the cavity, the light entry surface being convex with respect to the one or more light sources;
   a first refracting surface that is a plane;
   a reflecting surface that is a plane and is obliquely angled with respect to a central axis of the lens; and
   a second refracting surface extending from a bottom surface of the lens to the first refracting surface;
   wherein light entering the lens from the cavity and directly incident on the reflecting surface is reflected from the reflecting surface to the first refracting surface and refracted by the first refracting surface to exit the lens; and wherein light entering the lens from the cavity and directly incident on the second refracting surface is refracted by the second refracting surface to exit the lens.

12. The optical system of claim 1, wherein the cylindrical side emitter lens has a cross sectional shape of a side emitter lens along a plane defined by the forward direction and the long axis and wherein the cylindrical side emitter lens has the same cross sectional shape at every point along the short axis.

* * * * *